United States Patent
Kiser

(10) Patent No.: US 7,130,827 B2
(45) Date of Patent: Oct. 31, 2006

(54) BUSINESS CALLING CARD

(76) Inventor: Kenneth J. Kiser, 24 Boylston St. #4, Brockton, MA (US) 02301

( * ) Notice: Subject to any disclaimer, the term of this patent is extended or adjusted under 35 U.S.C. 154(b) by 612 days.

(21) Appl. No.: 09/790,262

(22) Filed: Feb. 21, 2001

(65) Prior Publication Data

US 2001/0034706 A1    Oct. 25, 2001

(51) Int. Cl.
*G06Q 40/00* (2006.01)
(52) U.S. Cl. .................................................. 705/41
(58) Field of Classification Search ................ 705/41
See application file for complete search history.

(56) References Cited

U.S. PATENT DOCUMENTS

| | | | |
|---|---|---|---|
| 5,537,314 A * | 7/1996 | Kanter | 705/14 |
| 5,864,609 A * | 1/1999 | Cross et al. | 379/114.13 |
| 6,032,136 A * | 2/2000 | Brake et al. | 705/41 |
| 6,192,117 B1 * | 2/2001 | Stephan | 379/114.18 |
| 6,256,614 B1 * | 7/2001 | Wecker et al. | 705/14 |
| 6,422,462 B1 * | 7/2002 | Cohen | 235/381 |
| 6,526,130 B1 * | 2/2003 | Paschini | 379/93.12 |
| 6,650,761 B1 * | 11/2003 | Rodriguez et al. | 382/100 |
| 6,690,779 B1 * | 2/2004 | Walker et al. | 379/144.01 |
| 2001/0005829 A1 * | 6/2001 | Raveis, Jr. | 705/1 |
| 2001/0011236 A1 * | 8/2001 | Shell | 705/26 |
| 2002/0120476 A1 * | 8/2002 | Labelle et al. | 705/4 |

FOREIGN PATENT DOCUMENTS

JP          02001094690 A  *  4/2001

OTHER PUBLICATIONS

Huggins K, et al, Life and Health Insurance Companies, Second Edition, Life management Institute, 1992, pp. 148-149, 376.*

* cited by examiner

*Primary Examiner*—Charles R. Kyle
(74) *Attorney, Agent, or Firm*—John P. McGonagle

(57) ABSTRACT

A combination business card and calling card. After receipt of the invention card, a card holder may use the card as a calling card by contacting a designated calling card service company and providing an identification code contained on a particular card. The service company will then set up a calling card account for the card holder. The identification code provided to the service company will identify the person or entity who originally presented the business card. The person or entity who originally presented the card to the card holder will be credited by the service company with a percentage of all subsequent calling card usage by the particular card holder.

6 Claims, 2 Drawing Sheets

BUSINESS CALLING CARD

BACKGROUND OF THE INVENTION

This invention relates generally to a telephone calling card and service, and in particular, to a calling card used as a business card.

The use of business cards in the course of business is well established. Business cards are printed in countless numbers annually and are passed freely between and to people for advertising and business purposes. In business it is usual to exhibit the name of the individual presenting the card along with the name, address and telephone number of the company or other entity represented by such individual. Some cards also include a company logo and, in some instances, key words or phrases normally relating in some way to either the company represented by the individual or relating in some way to the individual himself.

A particular function of a business card is for the purpose of recall. A person having a business card will very often present his card for purposes of introduction but intends that the recipient of the card retain the card for future reference, if and when the need arises. From the business point of view of the person giving the business card, it would be highly desirable to encourage the recipient to hold onto the card and, if possible, frequently have the card before him.

The U.S. telecommunications industry experiences rigorous competition for market share in local and long distance services. It is this competition, and the expectations of the modern day consumer, that drive telecommunications companies to quickly bring to market those products and services which provide competitive pricing, quality and convenience. One example of such service is the now familiar "calling card" which allows a subscriber to place toll calls while away from the home or office without having to bill the call to a third party, or to continually insert coins into a public telephone. For example, a typical calling card enables a user to dial a directory number of a called party and a calling card number to place a call. Upon validation of the dialed calling card number by a service company operator services system (OSS), a connection between the subscriber and the called party is established. The calling card subscriber subsequently pays for the telephone call, and all other calls placed during a predetermined period, upon receiving an itemized calling card bill.

To introduce and encourage the use of calling card services, companies have distributed "promotional" calling cards. A promotional calling card carries a pre-established non-billed balance which enables a user to place free telephone calls using the number printed on the face of the card until a non-billed balance is depleted. This promotional or trial use of a calling card is designed to convince potential customers of the ease-of-use and security associated with a particular calling card service. Once the non-billed balance is depleted, the user disposes of the card and, if he or she desires, contacts the issuing company for a permanent calling card.

Prior art promotional calling cards do not allow billing and thus, are issued with a predefined number which signifies to the OSS that the card is for promotional purposes, and that a billing record should not be generated for calls placed using the card. Permanent (or "unlimited use") calling card calls, however, are normally billed to a subscriber-specified directory number.

Although promotional calling cards are a valuable vehicle for introducing a calling card service, users of the cards who become accustomed to a particular promotional card number are inconvenienced when, upon electing to subscribe to a permanent calling card, a new number is assigned. In the calling card systems of the prior art, a new card number must be assigned due to card numbering rigidity which is imposed for proper billing. Thus, a prior art promotional calling card user cannot extend use of the card after the initial non-billed balance has been depleted. Since ease-of-use is the hallmark of any calling card service, inconveniences associated with calling card use may result in a loss of market share for the card-issuing company.

SUMMARY OF THE INVENTION

The present invention addresses the problems of the person presenting a business card, the calling card service company, and the end user. The present invention provides a combination business card and calling card. After receipt of the invention card, the recipient card holder may use the card as a calling card by contacting a designated calling card service company and providing an identification code contained on a particular card. The service company will then set up a calling card account for the card holder. The identification code provided to the service company will identify the person or entity who originally presented the business card. The person or entity who originally presented the card to the card holder will be credited with a percentage of all subsequent calling card usage by the particular card holder.

Every time the card holder uses the card as a calling card, the invention card will act as a business card and advertisement for the card presenter. The invention card works well for the service company, as the original card presenter is encouraging use of the service company's calling card service. By eliminating the two-step process of promotional cards, the end user is not inconvenienced by the need to obtain a second number after a promotional number expires. The credited percentage of calling card usage to the card presenter reduces or eliminates the presenter's advertising costs thereby encouraging him or her to distribute even more cards. The percentage paid by the service company to the card presenter will be substantially less than the service company's normal advertising costs. Also, the percentage paid is a function of usage, not requiring dramatic front end advertising costs.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
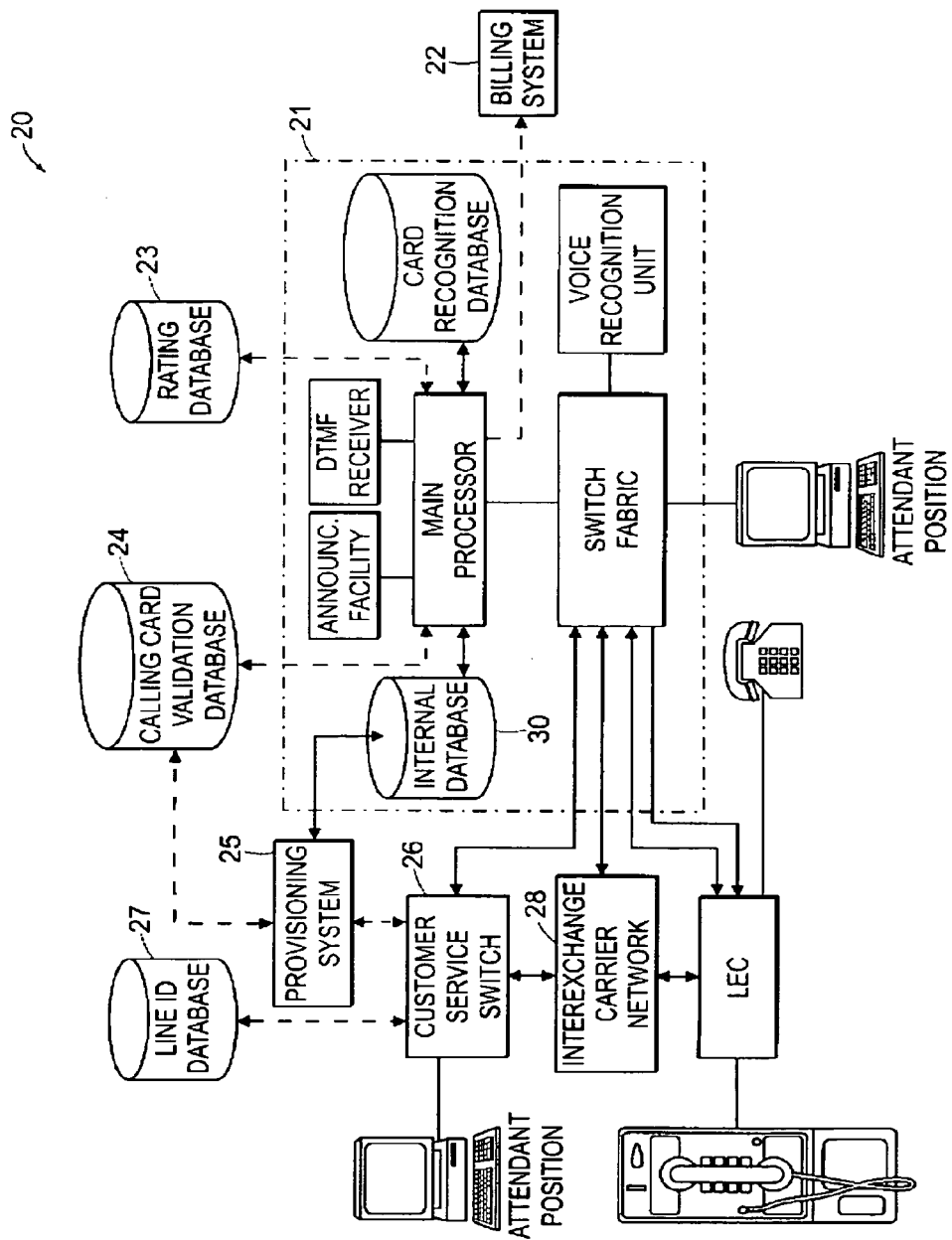
FIG. 1 is a simplified block diagram of a telecommunications network in which the present invention may be practiced.

Referring to the drawings in detail wherein like elements are indicated by like numerals, in one embodiment of the system of the present invention, a card presenter negotiates a percentage payment schedule and sets up a card identifier with a service company. The service company has or operates a telecommunications network 20 with an operator services system (OSS) 21 interconnected to a calling card validation data base 24. The card identifier will also act as a special account for the card presenter. The card presenter then makes up or has the service company make up a number of combination business/calling cards, each card having the card identifier. Each card would also have the service company name and designated activation telephone number or Internet WEB site address.

Figure 2:
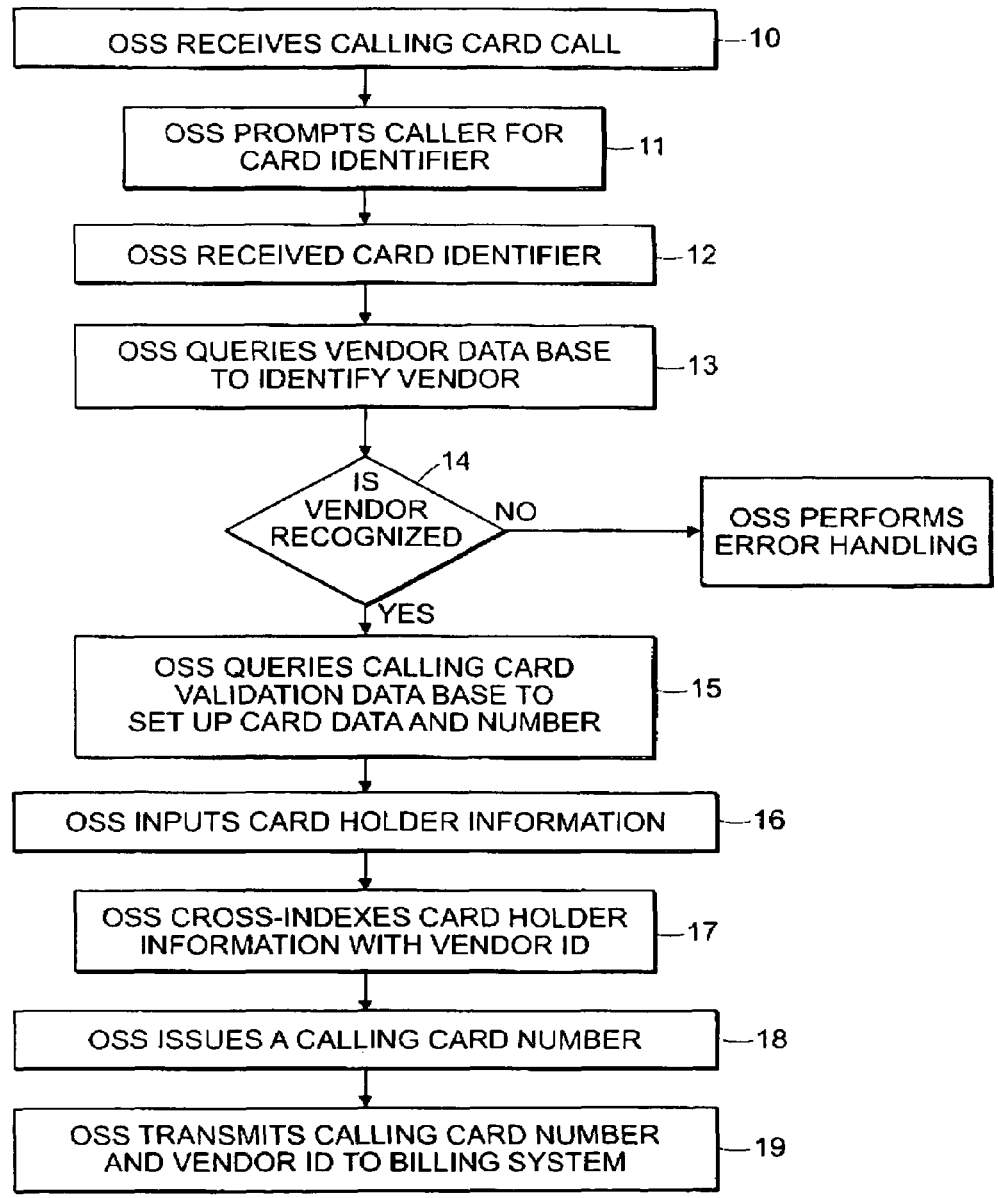
FIG. 2 is a flow diagram of the steps performed in the network of FIG. 1.

Referring more particularly to FIG. 2, as each card recipient contacts 10 the service company by means of the specially designated, toll-free, telephone number or Internet WEB site address to set up a calling card account, the card recipient will be asked for the card identifier 11. When the service company receives the card identifier 12, the service company will query 13 an internal data base to identify the card presenter, identified to the service company as a vendor. If the vendor is recognized 14, the service company will query 15 its own internal calling card data base to set up a calling card number for the card recipient, i.e., holder. The service company inputs 16 pertinent card holder information into its internal data base. The service company "tags" 17, i.e., cross-indexes, the card recipient's account with the card identifier, i.e., vendor Id. The service company then issues 18 a calling card number to the card recipient. The card recipient information and vendor identifier are passed 19 to the service company's billing system. Subsequently, as the card holder uses the calling card feature of the invention card, a previously agreed-to percentage value of the card holder's calling card usage will be credited to the card presenter's special account. The contents or a percentage of the contents of the special account will be paid out to the card presenter on a periodic basis.

The service company will have a telecommunications network 20 on which the present invention may be practiced. See FIG. 1. The network 20 will include an operator services system (OSS) 21, billing system 22, rating data base 23, calling card validation data base 24, provisioning system 25, customer service switch 26, customer line identification data base 27, inter-exchange network 28, and local exchange carrier 29. The OSS 21 contains an internal data base 30 for storing card identifiers and card presenter (vendor) information. The vendor information in the internal data base 30 is interconnected to the card validation data base 24 and a billing system 22. The card validation data base 24 contains the activated account and billing information for a card holder, cross-indexed to the vendor information in the internal data base 30. The billing system 22 will have provisions for calculating a vendor percentage and means for crediting the vendor's special account.

In accordance with an exemplary embodiment of the method of the present invention, an invention card call is received by the service company. The service company sets up a new calling card account for the caller in the card validation data base, issues the caller a calling card number, and cross-indexes the new calling card account with the vendor data base using the calling card identifier received from the caller. Once the card validation data base is updated, future calls by the caller will be completed using the calling card number issued. During the periodic caller billing cycle, the service company will apply the vendor's percentage(s) to the caller's bill and credit the percentage to the vendor's account.

It is understood that the above-described embodiment is merely illustrative of the application. Other embodiments may be readily devised by those skilled in the art which will embody the principles of the invention and fall within the spirit and scope thereof. For example, the card holder may activate his account through the Internet. Also, the card presenter may distribute his or her cards by means of the Internet.

I claim:

1. A method of using a business card as a calling card in combination with a service company having a telecommunications network with an operating services system interconnected to a calling card validation database, comprising the steps of:
   establishing a card identifier on said service company calling card validation database;
   establishing a card identifier account for a card presenter in said service company operating services system;
   providing a plurality of combination business and calling cards, each card having said card identifier;
   distributing said combination business and calling cards to a plurality of card recipients, said distribution being made by said card presenter;
   providing a designated activation telephone number on each said combination business and calling card wherein each card recipient communicates over said telecommunications network with said operating services system and establishes a calling card account;
   establishing a card recipient calling card account tagged with said card identifier; and
   crediting a percentage value of each card recipient calling card account tagged with said card identifier to said card identifier account.

2. The method of claim 1, further comprising:
   paying out said card identifier account to said card presenter.

3. The method of claim 2, further comprising:
   establishing a new calling card account for the card recipient in said service company calling card validation data base;
   issuing the card recipient a calling card number; and
   cross-indexing the new calling card account with a service company card presenter data base using the card identifier on said card recipient's card.

4. A method of using a business card as a calling card in combination with a service company having a telecommunications network with an operating services system interconnected to a calling card validation database, comprising the steps of:
   establishing a card identifier on said service company validation database;
   establishing a card identifier account for a card presenter in said service company operating services system;
   providing a plurality of combination business and calling cards, each card having said card identifier;
   distributing said combination business and calling cards to a plurality of card recipients, said distribution being made by said card presenter;
   providing a designated activation Internet WEB site address on each said card wherein each card recipient communicates over said telecommunications network with said operating services system and establishes a calling card account;
   establishing a card recipient calling card account tagged with said card identifier; and
   crediting a percentage value of each card recipient calling card account tagged with said card identifier to said card identifier account.

5. The method of claim 4, further comprising:
   paying out said card identifier account to said card presenter.

6. The method of claim 5, further comprising:
   establishing a new calling card account for the card recipient in said service company calling card validation data base;
   issuing the card recipient a calling card number; and
   cross-indexing the new calling card account with a service company card presenter data base using the card identifier on said card recipient's card.

* * * * *